United States Patent [19]

Klyce

[11] Patent Number: 5,184,541
[45] Date of Patent: Feb. 9, 1993

[54] STEAM EVACUATION UNIT FOR A PEELER

[75] Inventor: Thomas A. Klyce, Memphis, Tenn.

[73] Assignee: Ranger Tool Co., Bartlett, Tenn.

[21] Appl. No.: 888,163

[22] Filed: May 26, 1992

[51] Int. Cl.⁵ .................... A22C 11/00; A22C 13/00
[52] U.S. Cl. ........................ 99/472; 99/483; 99/584; 452/50
[58] Field of Search ............... 99/441, 450, 472–474, 99/476, 477, 483, 516, 584, 588, 593; 452/50

[56] References Cited

U.S. PATENT DOCUMENTS

| | | | |
|---|---|---|---|
| 1,403,045 | 1/1922 | McHugh | 99/441 |
| 2,374,425 | 4/1945 | De Weerth | 99/473 |
| 2,682,827 | 7/1954 | Gressly | 99/473 |
| 2,737,374 | 3/1956 | Terrett | 99/483 |
| 3,312,995 | 4/1967 | Garey . | |
| 3,337,905 | 8/1967 | Vedvik | 452/50 |
| 3,412,671 | 11/1968 | Merlis | 99/234 |
| 3,500,743 | 3/1970 | Cameron | 452/50 |
| 3,512,471 | 5/1970 | Sargeant | 99/472 |
| 4,118,828 | 10/1978 | Melanson | 452/50 |
| 4,222,150 | 9/1980 | Anderson | 452/50 |
| 4,414,707 | 11/1983 | Koken . | |
| 4,532,858 | 8/1985 | Hershfeld | 452/51 |
| 4,905,587 | 3/1990 | Smithers | 99/494 |
| 5,050,491 | 9/1991 | Thompson | 99/483 |
| 5,094,649 | 3/1992 | Hall et al. | 452/50 |

FOREIGN PATENT DOCUMENTS

| | | | |
|---|---|---|---|
| 2601582 | 7/1976 | Fed. Rep. of Germany | 452/50 |
| 2-295474 | 12/1990 | Japan | 452/50 |

Primary Examiner—Timothy F. Simone
Attorney, Agent, or Firm—Walker, McKenzie & Walker

[57] ABSTRACT

A unit for being positioned between an outlet conveyor and an inlet conveyor having a steam source coupled thereto. The unit includes a body machined out of metal or the like. The body has a passageway with an inlet end for being coupled to the outlet port of the inlet conveyor and an outlet end for being coupled to the inlet port of the outlet conveyor. The body has a vacuum port communicating with the passageway for being coupled to a vacuum source for allowing steam to be sucked from the passageway therethrough. A gate is machined out of plastic or the like and attached to the body for movement between an opened position in which the passageway through the body is opened and a closed position in which the passageway through the body is closed at a point between the outlet end of the passageway and the vacuum port.

16 Claims, 2 Drawing Sheets

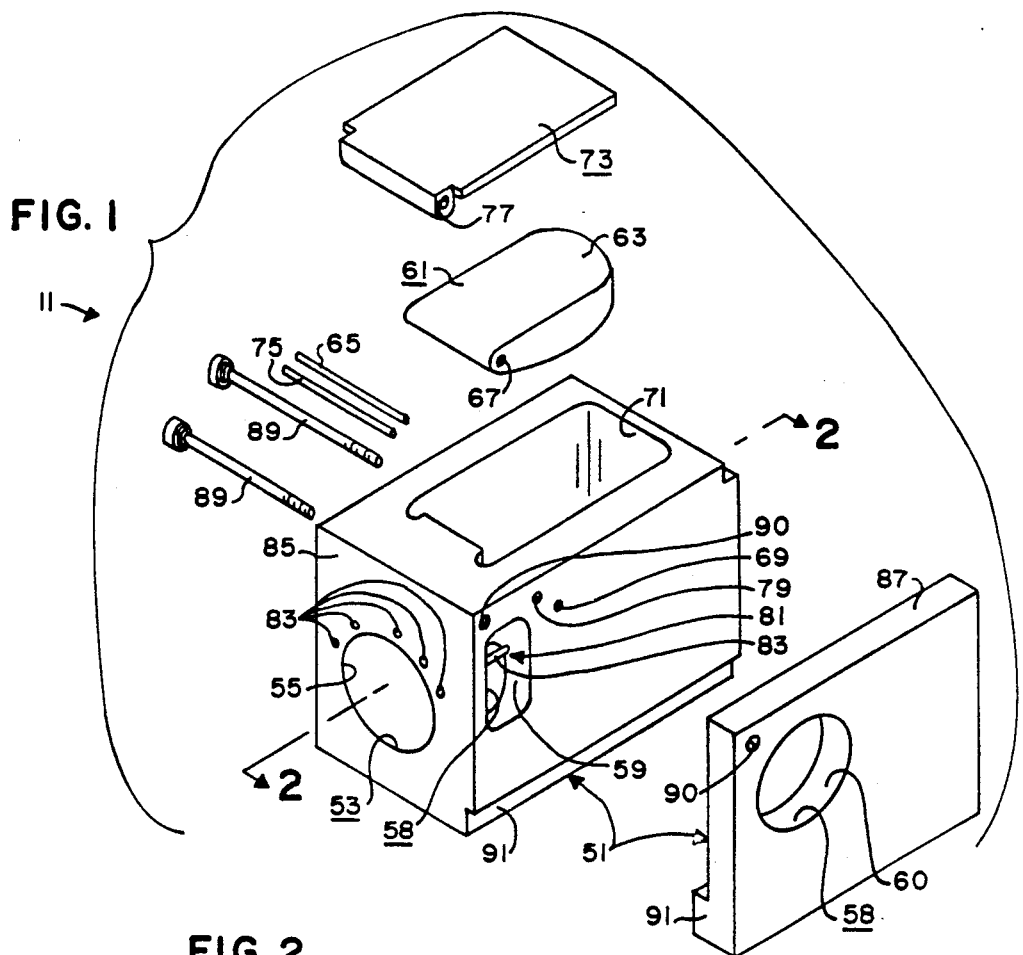
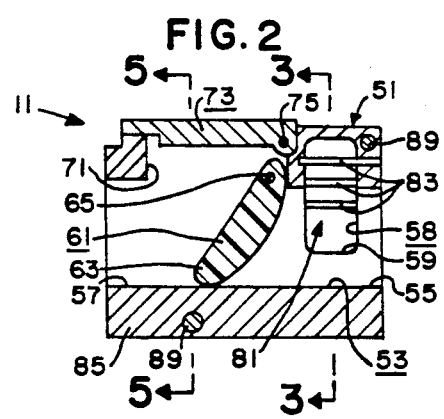
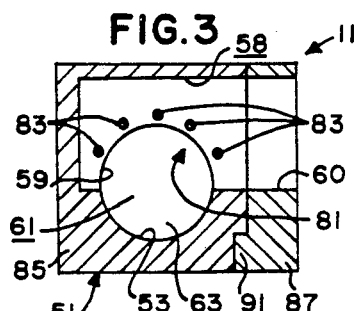
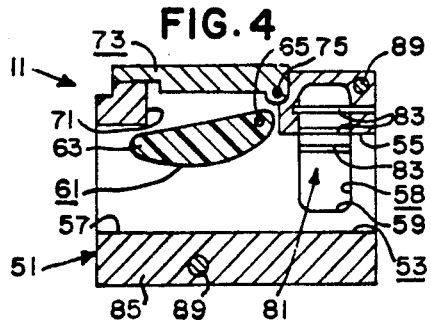
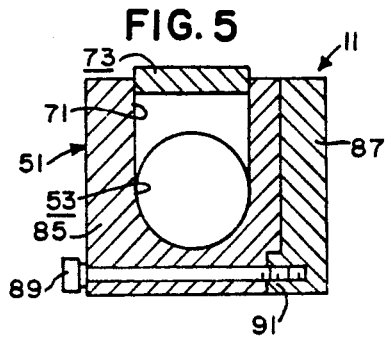

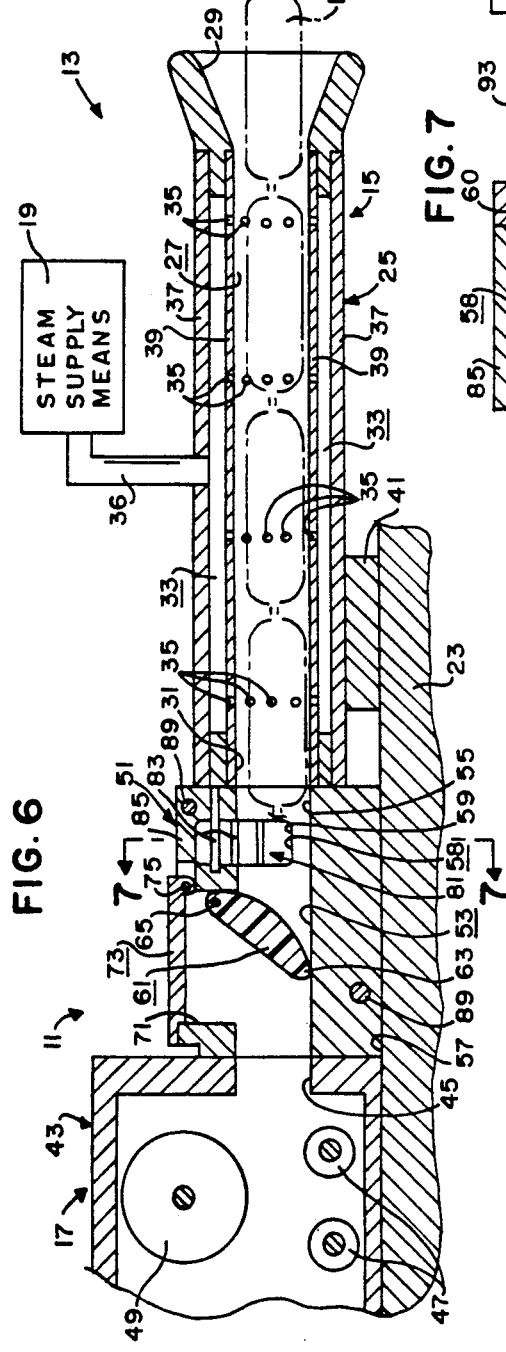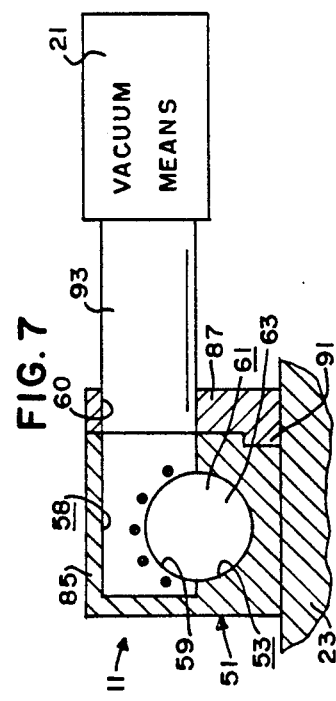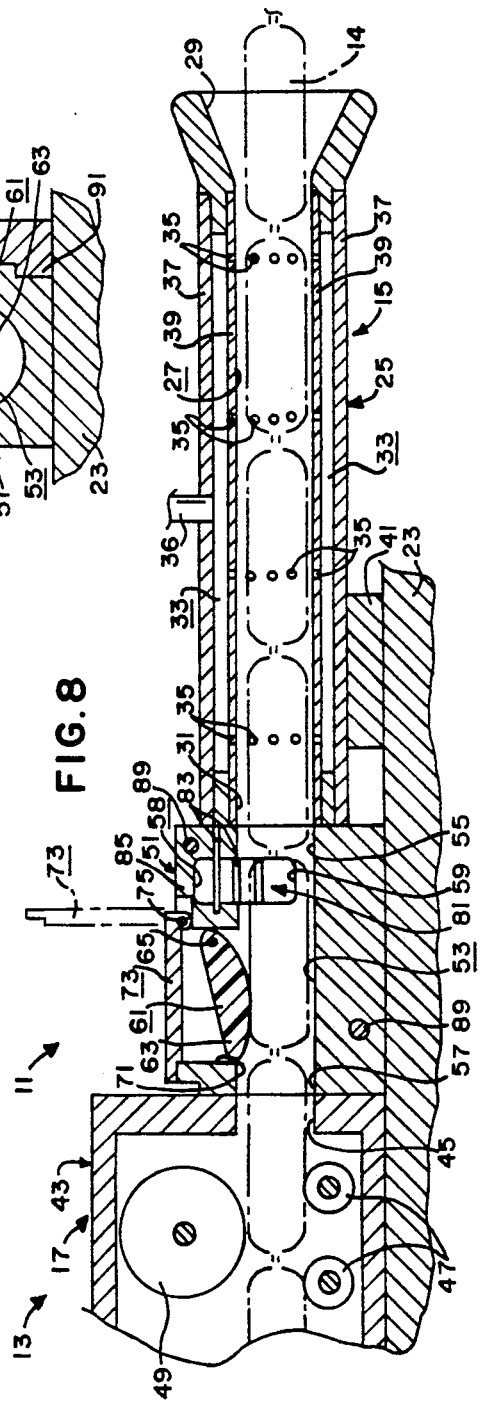

STEAM EVACUATION UNIT FOR A PEELER

BACKGROUND OF THE INVENTION

1. Field of the Invention

The present invention relates, in general, to a steam evacuation unit for a frankfurter peeler or the like.

2. Description of the Related Art

Frankfurters are commonly manufactured by placing the desired ingredients in an elongated celluloid or plastic tube (often referred to as the "skin" of the frankfurter). The combination is then processed or cooked and the plastic tube or skin is then removed from the processed frankfurters prior to packaging. Frankfurter peelers have been provided for conditioning and peeling the skin from processed frankfurters. Such frankfurter peelers are well known to those skilled in the art and typically include a peeling unit having a knife or the like for slitting the skin, and a steam conditioning unit for applying steam to the frankfurters before the frankfurters are conveyed to the peeling unit to soften the skin prior to being slit by the knife of the peeling unit, etc.

One problem common to many such frankfurter peelers is that steam from the steam conditioning unit can escape or is exhausted directly from the steam conditioning unit into the atmosphere, i.e., into the room where the frankfurter peeler is located. Such steam creates moisture, high humidity, and, because of the relatively low temperature of the rooms that contain such frankfurters peelers (e.g., typically 40 degrees Fahrenheit or lower), condensation, etc.

Thompson, U.S. Pat. No. 5,050,491, issued Sep. 24, 1991, discloses a steam conditioning unit for a frankfurter peeler that includes an elongated perforate conditioning chamber, and an enlarged imperforate chamber surrounding the perforate conditioning chamber for defining a manifold between the perforate conditioning chamber and the imperforate chamber, a source of steam connected to the manifold for passing into the perforate conditioning chamber for conditioning frankfurters passed therethrough prior to peeling, a jacket surrounding the imperforate chamber for defining an eliminator chamber between the jacket and the imperforate chamber for receiving exhaust steam and condensate from the perforate conditioning chamber, and a source of suction connected to the eliminator chamber for removing exhaust steam and condensate from the eliminator chamber.

A preliminary patentability search conducted in class 99, subclass 483, and class 452, subclasses 30 and 50 produced the following patents which may relate to the present invention: Garey, U.S. Pat. No. 3,312,995, issued Apr. 11, 1967; Merlis, U.S. Pat. No. 3,412,671, issued Nov. 26, 1968; Koken, U.S. Pat. No. 4,414,707, issued Nov. 15, 1983; and Hall et al., U.S. Pat. No. 5,094,649, issued Mar. 10, 1992.

Garey discloses a typical frankfurter peeler including a steam conditioning unit and a peeling unit.

Merlis discloses an apparatus for continuously dry-rendering organic materials comprising offal and the like.

Koken discloses a skinned sausage peeler including a fluid conditioning unit and a peeling unit with an exhaust port associated with the fluid conditioning unit to minimize the escape of the conditioning fluid from the fluid conditioning unit through the sausage inlet port of the fluid conditioning unit.

Hall et al. discloses an apparatus for peeling sausages including a steam conditioning unit and a peeling unit.

Nothing in the known prior art discloses or suggests the present invention. More specifically, nothing in the known prior art discloses or suggests a steam evacuation including, in general, a body having a passageway; the passageway having an inlet end for being coupled to the outlet port of an inlet conveyor and having an outlet end for being coupled to the inlet port of an outlet conveyor; the body having a vacuum port communicating with the passageway for being coupled to a vacuum source for allowing steam to be sucked from the passageway therethrough.

SUMMARY OF THE INVENTION

The present invention is directed toward providing an improved steam evacuation unit for a frankfurter peeler. The concept of the present invention is to provide a vacuum unit for being positioned between the steam conditioning chamber and the peeling unit of a typical frankfurter peeler for removing steam from the frankfurter passageway before the steam can escape therefrom.

The steam evacuation unit of the present invention includes, in general, a body having a passageway; the passageway having an inlet end for being coupled to an inlet conveyor and having an outlet end for being coupled to an outlet conveyor; the body having a vacuum port communicating with the passageway for being coupled to a vacuum source for allowing steam to be sucked from the passageway therethrough.

One object of the present invention is to provide a unit for placement between the outlet end of a steam conditioning unit and the inlet end of a peeling unit of a frankfurter peeler for collecting and evacuating steam therefrom before the steam can escape from the peeling unit into the room in which the peeling unit is located, etc.

Another object of the present invention is to provide such a unit which substantially prevents steam from passing from the steam conditioning unit to the peeling unit when no frankfurters are passing from the steam conditioning unit to the peeling unit.

Another object of the present invention is to provide such a unit that can be easily replaced with another such unit for use with different size frankfurters.

BRIEF DESCRIPTION OF THE DRAWINGS

FIG. 1 is an exploded perspective view of the steam evacuation unit of the present invention.

FIG. 2 is a sectional view of the steam evacuation unit of the present invention substantially as taken on line 2—2 of FIG. 1 but with all the various components of the steam evacuation unit joined together.

FIG. 3 is a sectional view of the steam evacuation unit of the present invention substantially as taken on line 3—3 of FIG. 2.

FIG. 4 is a sectional view of the steam evacuation unit of the present invention similar to FIG. 2 but with a gate element of the steam evacuation unit shown in an opened position.

FIG. 5 is a sectional view of the steam evacuation unit of the present invention substantially as taken on line 5—5 of FIG. 2.

FIG. 6 is a somewhat diagrammatic sectional view of the steam evacuation unit of the present invention shown in combination with a steam conditioning unit and a peeling unit of a frankfurter peeler.

FIG. 7 is a somewhat diagrammatic sectional view of the steam evacuation unit of the present invention substantially as taken on line 7—7 of FIG. 6.

FIG. 8 is a somewhat diagrammatic sectional view of the steam evacuation unit of the present invention similar to FIG. 6 but with the gate element of the steam evacuation unit shown in an opened position and with an access door of the steam evacuation unit shown in an opened position in broken lines.

DESCRIPTION OF THE PREFERRED EMBODIMENT

The preferred embodiment of the steam evacuation unit of the present invention is shown in FIGS. 1-8 and identified by the numeral 11. The steam evacuation unit 11 is for use with an inlet conveyor, a steam source coupled to the inlet conveyor, an outlet conveyor, and a vacuum source. More specifically, the steam evacuation unit 11 is especially designed for use in combination with a typical frankfurter peeler 13 for removing the plastic skin or the like from a plurality of frankfurters 14. The frankfurter peeler 13 is preferably of the type including a steam conditioning chamber or unit 15 and a peeling unit 17, and a steam source or supply means 19 for supplying a quantity of steam to the steam conditioning unit 15, and with a vacuum source or means 21 for applying a vacuum to the steam evacuation unit 11.

The frankfurter peeler 13 may be of any typical construction and operation well known to those skilled in the art. Thus, the frankfurter peeler 13 may include a cabinet or table 23 to which the steam conditioning unit 15 and the peeling unit 17 are mounted.

The steam conditioning unit 15 may include an elongated tube 25 forming an inlet conveyor having a passageway 27 with an inlet end 29 for receiving a quantity of frankfurters 14 (e.g., a continuous "rope" of joined together frankfurters 14 as will now be apparent to those skilled in the art), and with an outlet end 31. The inlet end 29 of the passageway 27 may be flared as clearly shown in FIGS. 6 and 8 to create a funnel-like portion for allowing the frankfurters 14 to be easily fed thereinto. The tube 25 preferably includes an interior chamber 33 extending substantially the entire length thereof and communicating with the passageway 27 through a plurality of spaced apertures 35 to form a manifold or the like. The steam supply means 19 is coupled to the chamber 33 through a conduit 36 or the like for allowing steam to pass from the steam supply means 19 to the chamber 33. The steam will then pass from the chamber 33, through the apertures 35, into the passageway 27 for conditioning frankfurters 14 passing through the passageway 27 as will be apparent to those skilled in the art. The construction of the tube 25 may vary as will now be apparent to those skilled in the art. Preferably, the tube 25 is machined or otherwise constructed from metal such as aluminum and/or stainless steel with one or multi-piece outer tube 37 and a one piece inner tube 39 secured to the outer tube 37 to form the chamber 33 therebetween, etc., as clearly shown in FIGS. 6 and 8 and as will now be apparent to those skilled in the art. The tube 25 may be mounted to the table 23 in any manner now apparent to those skilled in the art such as, for example, by way of a connecting member 41 extending between the table 23 and the tube 25.

The peeling unit 17 may include a housing 43 having an inlet aperture 45 for receiving a quantity of frankfurters 14, conveying means having feed wheels 47 or the like for conveying the frankfurters 14 through the frankfurter peeler 13, and knife means 49 for cutting a slit in the skin of the frankfurters 14 as the frankfurters 14 are conveyed through the peeling unit 17 a will be apparent to those skilled in the art. The housing 43 may be mounted directly on the table 23.

The steam supply means 19 may consist of any typical device for supplying the necessary quantity of steam as will be apparent to those skilled in the art. The vacuum means 21 may consist of any typical device for supplying the necessary suction or vacuum such as an exhaust fan or the like as will now be apparent to those skilled in the art.

The steam evacuation unit 11 includes a body 51 having a passageway 53 for being coupled between the outlet port of an inlet conveyor and to the inlet port of an outlet conveyor. More specifically, the passageway 53 has an inlet end 55 for being coupled to the outlet end 31 of the passageway 27 of the tube 25 of the steam conditioning unit 15, and an outlet end 57 for being coupled to the inlet aperture 45 of the housing 43 of the peeling unit 17. Thus, frankfurters 14 can pass from the outlet end 31 of the passageway 27 of the tube 25 of the steam conditioning unit 15, through the passageway 53 of the body 51 of the steam evacuation unit 11, to the inlet aperture 45 of the housing 43 of the peeling unit 17 as will now be apparent to those skilled in the art. The body 51 has a vacuum port 58 communicating with the passageway 53 for being coupled to the vacuum means 21 for allowing steam and condensation to be sucked from the passageway 53 therethrough. More specifically, the vacuum port 58 has a mouth or inlet end 59 communicating with the passageway 53 and an outlet end 60 for being coupled to the vacuum means 21.

The steam evacuation unit 11 preferably includes limiting means for limiting the amount of steam that can pass through the passageway 53 through the body 51 of the steam evacuation unit 11. The limiting means preferably includes closing means for substantially closing off as much of the cross-sectional area of the passageway 53 a possible. Thus, the closing means preferably closes off all of the cross-sectional area of the passageway 53 when no frankfurter 14 is passing therethrough, and preferably closes off substantially all of the passageway 53 except that closed off by a frankfurter 14 when a frankfurter 14 is passing through the passageway 53. The limiting and closing means preferably includes a door or gate 61 attached to the body 51 of the steam evacuation unit 11 for movement between an opened position in which the passageway 53 through the body 51 is opened and a closed position in which the passageway 53 through the body 51 is closed at a point between the outlet end 57 of the passageway 53 and the vacuum port 58. The bottom 63 of the gate 61 is preferably rounded and designed so as to make a substantially air-tight seal with the bottom of the passageway 53 through the body 51 when the gate 61 is in the closed position. The top of the gate 61 is preferably designed so as to make a substantially air-tight seal with portions of the body 51 when the gate 61 is in either the opened or closed positions. The gate 61 is preferably pivotally attached to the body 51 for being moved from the closed position to the opened position by a frankfurter 14 passing from the inlet end 55 to the outlet end 57 of the passageway 53. The gate 61 is preferably designed so that means such as gravity will cause the gate 61 to move toward the closed position. The steam evacuation unit 11 preferably includes a gate pivot rod 65 for extending through a transverse aperture 67 in the top end of the gate 61 and into a transverse aperture 69 in the body 51 (see FIG. 1) for pivotally attaching the gate 61 to the body 51 as will now be apparent to those skilled in the art.

The body 51 of the steam evacuation unit 11 preferably has an access port 71 communicating with the passageway 53 for allowing access to the passageway 53 and the gate 61. The access port 71 is preferably formed in the top of the body 51 directly over the gate 61 to allow room for the top of the gate 61. The bottom of the access port 71 is preferably blocked by the gate 61 when the gate 61 is in the opened position as clearly shown in FIGS. 4 and 8.

The steam evacuation unit 11 preferably includes an access door 73 attached to the body 51 for blocking the top of the access port 71. The access door 73 is preferably movable between an opened position (shown in broken lines in FIG. 8) in which the access port 71 is opened and a closed position (shown in solid lines in FIGS. 2, 4, 5, 6 and 8) in which the access port 71 is closed. The access door 73 is preferably pivotally attached to the body 51. Thus, the steam evacuation unit 11 preferably includes an access door pivot rod 75 for extending through a transverse aperture 77 in the access door 73 and into a transverse aperture 79 in the body 51 (see FIG. 1) for pivotally attaching the access door 73 to the body 51 as will now be apparent to those skilled in the art.

The steam evacuation unit 11 preferably includes sieve means 81 associated with the vacuum port 58 for preventing matter larger than a certain size (e.g., frankfurters 14) from being sucked into the vacuum port 58. The sieve means 81 preferably includes a plurality of bar members 83 extending transversely across the inlet end 59 of the vacuum port 58. More specifically, the bar members 83 preferably extend across the inlet end 59 of the vacuum port 58 directly or closely adjacent the junction between the vacuum port 58 and the passageway 53 as clearly shown in FIGS. 3 and 7. By being positioned adjacent the junction between the inlet end 59 of the vacuum port 58 and the passageway 53, the bar members 83 effectively define a continuation of the wall of the passageway 53 over the mouth of the vacuum port 58 to guide the frankfurters 14 past the mouth or inlet end 59 of the vacuum port 58 as will now be apparent to those skilled in the art. The opposite ends of each bar member 83 are preferably press fitted into apertures in the body 51 (see FIGS. 3 and 4) or the like for being securely mounted thereto as will now be apparent to those skilled in the art. The bar members 83 are preferably spaced apart from one another a distance that allows steam and condensation to be easily drawn therethrough but which prevents the frankfurters 14 from being drawn into the vacuum port 58.

The body 51 of the steam evacuation unit 11 preferably includes a first part 85 including the passageway 53, the inlet end 59 of the vacuum port 58, the access port 71, etc., and a second part 87 including the outlet end 60 of the vacuum port 58. Bolts 89 or the like are provided for coacting with apertures 90 in the first and second parts 85, 87 to removably secure the first and second parts 85, 87 together as will now be apparent to those skilled in the art. The second part 87 is preferably adapted to be substantially permanently mounted to the table 23 of the frankfurter peeler 13 by bolts or the like (not shown) between the steam conditioning unit 15 and the peeling unit 17. The first part 85 can then be easily and quickly attached, removed and/or replaced by way of the bolts 89 as will now be apparent to those skilled in the art. This allows one first part 85 with a passageway 53 of a first diameter to be easily replaced with another first part 85 having a passageway of a second diameter to thereby allow the steam evacuation unit 11 to easily accommodate frankfurters 14 of different diameters. The mating surfaces of the first and second parts 85, 87 may have coacting offset portions 91 for helping to align the first and second parts 85, 87 with respect to one another, etc.

The steam evacuation unit 11 ma be constructed out of various materials in various manners, designs and sizes as will now be apparent to those skilled in the art. Thus, the body 51 and access door 73 are preferably machined or otherwise formed out of metal such as stainless steel; the gate 61 is preferably machined or otherwise formed out of plastic; and the pivot rods 65, 75, bar members 83, and bolts 89 preferably consist of off-the-shelf items, etc.

To use the steam evacuation unit 11, the body 51 is merely mounted to the frankfurter peeler 13 between the steam conditioning unit 15 and the peeling unit 17. The outlet end 31 of the passageway 27 of the tube 25 of the steam conditioning unit 15 is coupled to the inlet end 55 of the passageway 53 of the body 51, and the inlet aperture 45 of the housing 43 of the peeling unit 17 is coupled to the outlet end 57 of the passageway 53 of the body 51 in any manner now apparent to those skilled in the art such as by being merely secured to the table 23 in communication with the respective portions of the steam conditioning unit 15 and peeling unit 17. The vacuum means 21 is connected to the vacuum port 58 by way of a conduit 93 or the like extending between the inlet port of the vacuum means 21 and the outlet end 60 of the vacuum port 58. The frankfurters 14 are initially manually fed into the inlet end 29 of the passageway 27 of the tube 25 of the steam conditioning unit 15, through the passageway 53 in the body 51 of the steam evacuation unit 11, and through the inlet aperture 45 in the housing 43 of the peeling unit 17 where the feed wheels 47 will engage the frankfurters 14 to pull the frankfurters 14 through the steam conditioning unit 15 and steam evacuation unit 11 and feed the frankfurters 14 through the peeling unit 17 as will now be apparent to those skilled in the art. Prior to the frankfurters 14 being fed past the gate 61, the gate 61 will be in the closed position to prevent steam from passing through the passageway 53 to the peeling unit 17 and to allow the vacuum means 21 to effectively evacuate the steam from the passageway 53 as will now be apparent to those skilled in the art. As the frankfurters 14 are fed past the gate 61, the frankfurters 14 will physically push the gate 61 toward the opened position to allow the frankfurters 14 to pass through the steam evacuation unit 11 to the peeling unit 17. However, gravity or the like will cause the bottom 63 of the gate 61 to rest on the top of the portion of the frankfurter 14 or the connecting rope between two adjacent frankfurters 14, etc., directly beneath the bottom 63 of the gate 61 so that the gate 61 will block as much of the passageway 53 as possible, depending on the diameter of the portion of the frankfurter 14 or the connecting rope between two adjacent frankfurters 14, etc., directly beneath the bottom 63 of the gate 61. This will prevent as much of the steam as possible from passing through the passageway 53 to the peeling unit 17 and allow the vacuum means 21 to evacuate the steam from the passageway 53 as efficiently and effectively as possible as will now be apparent to those skilled in the art.

Although the present invention has been described and illustrated with respect to a preferred embodiment and a preferred use therefor, it is not to be so limited since modifications and changes can be made therein which are within the full intended scope of the invention.

I claim:

1. A steam evacuation unit for use with an inlet conveyor having an outlet port, a steam source coupled to the inlet conveyor, an outlet conveyor having an inlet port, and a vacuum source, said steam evacuation unit comprising: a body having a passageway; said passageway having an inlet end for being coupled to the outlet port of an inlet conveyor and having an outlet end for being coupled to the inlet port of an outlet conveyor; said body having a vacuum port communicating with said passageway for being coupled to a vacuum source for allowing steam to be sucked from said passageway therethrough; and closing means for substantially closing off as much of the cross-sectional area of said passageway of said body as possible.

2. A steam evacuation unit for use with an inlet conveyor having an outlet port, a steam source coupled to the inlet conveyor, an outlet conveyor having an inlet port, and a vacuum source, said steam evacuation unit comprising: a body having a passageway; said passageway having an inlet end for being coupled to the outlet port of an inlet conveyor and having an outlet end for being coupled to the inlet port of an outlet conveyor; said body having a vacuum port communicating with said passageway for being coupled to a vacuum source for allowing steam to be sucked from said passageway therethrough; and a gate attached to said body for movement between an opened position in which said passageway through said body is opened and a closed position in which said passageway through said body is closed at a point between said outlet end of said passageway and said vacuum port.

3. The steam evacuation unit of claim 2 in which is included sieve means associated with said vacuum port for preventing matter larger than a certain size from being sucked into said vacuum port.

4. The steam evacuation unit of claim 3 in which said sieve means includes a plurality of bar members extending transversely across said vacuum port.

5. The steam evacuation unit of claim 2 in which said gate is pivotally attached to said body.

6. The steam evacuation unit of claim 5 in which said body has an access port communicating with said passageway for allowing access to said passageway and said gate.

7. The steam evacuation unit of claim 6 in which is included an access door attached to said body for movement between an opened position in which said access port is opened and a closed position in which said access port is closed.

8. The steam evacuation unit of claim 7 in which said access door is pivotally attached to said body.

9. A steam evacuation unit for a frankfurter peeler of the type including a steam conditioning unit and a peeling unit; said steam evacuation unit comprising:
    a) a body having a passageway for allowing frankfurters to pass therethrough from the steam conditioning unit to the peeling unit; said passageway having an inlet end for being coupled to the outlet end of the steam conditioning unit and having an outlet end for being coupled to the inlet end of the peeling unit; said body having a vacuum port communicating with said passageway for allowing steam to be sucked from said passageway therethrough; and
    b) a gate attached to said body for movement between an opened position in which said passageway through said body is opened and a closed position in which said passageway through said body is closed at a point between said outlet end of said passageway and said vacuum port.

10. The steam evacuation unit of claim 9 in which is included sieve means associated with said vacuum port for preventing frankfurters from being sucked into said vacuum port.

11. The steam evacuation unit of claim 10 in which said sieve means includes a plurality of bar members extending transversely across said vacuum port.

12. The steam evacuation unit of claim 9 in which said gate is pivotally attached to said body.

13. The steam evacuation unit of claim 12 in which said body has an access port communicating with said passageway for allowing access to said passageway and said gate.

14. The steam evacuation unit of claim 13 in which is included an access door attached to said body for movement between an opened position in which said access port is opened and a closed position in which said access port is closed.

15. The steam evacuation unit of claim 14 in which said access door is pivotally attached to said body.

16. The combination with a frankfurter peeler of the type including a steam conditioning unit and a peeling unit, a steam source coupled to the steam conditioning unit, and a vacuum source, of a steam evacuation unit; said steam evacuation unit comprising:
    a) a body having a passageway for allowing frankfurters to pass therethrough from the steam conditioning unit to the peeling unit; said passageway having an inlet end coupled to the outlet end of the steam conditioning unit and having an outlet end coupled to the inlet end of the peeling unit; said body having a vacuum port coupled to the vacuum source and communicating with said passageway for allowing steam to be sucked from said passageway therethrough; and
    b) a gate attached to said body for movement between an opened position in which said passageway through said body is opened and a closed position in which said passageway through said body is closed at a point between said outlet end of said passageway and said vacuum port.

* * * * *